US009181369B2

(12) United States Patent
Tso et al.

(10) Patent No.: US 9,181,369 B2
(45) Date of Patent: Nov. 10, 2015

(54) POLYMER FILMS HAVING IMPROVED HEAT SEALING PROPERTIES

(71) Applicant: Chevron Phillips Chemical Company LP, The Woodlands, TX (US)

(72) Inventors: Chung Tso, Bartlesville, OK (US); Ashish M. Sukhadia, Bartlesville, OK (US); Albert P. Masino, Tulsa, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 31 days.

(21) Appl. No.: 13/794,070

(22) Filed: Mar. 11, 2013

(65) Prior Publication Data
US 2014/0256899 A1 Sep. 11, 2014

(51) Int. Cl.
*C08F 210/00* (2006.01)
*C08F 10/00* (2006.01)
*C08F 210/16* (2006.01)
*C08L 23/08* (2006.01)

(52) U.S. Cl.
CPC ........... *C08F 210/16* (2013.01); *C08L 23/0807* (2013.01)

(58) Field of Classification Search
CPC ................................ C08F 210/16; C08F 4/44
USPC ........................................................ 526/348
See application file for complete search history.

(56) References Cited

U.S. PATENT DOCUMENTS

| 3,248,179 | A | 4/1966 | Norwood |
| 4,501,885 | A | 2/1985 | Sherk et al. |
| 4,588,790 | A | 5/1986 | Jenkins, III et al. |
| 4,939,217 | A | 7/1990 | Stricklen |
| 5,191,132 | A | 3/1993 | Patsidis et al. |
| 5,210,352 | A | 5/1993 | Alt et al. |
| 5,347,026 | A | 9/1994 | Patsidis et al. |
| 5,352,749 | A | 10/1994 | DeChellis et al. |

(Continued)

FOREIGN PATENT DOCUMENTS

| EP | 0246369 B1 | 4/1992 |
| EP | 1930350 | 6/2008 |

(Continued)

OTHER PUBLICATIONS

International Search Report dated May 27, 2014, International Application No. PCT/US2014/021132.

(Continued)

*Primary Examiner* — William Cheung
(74) *Attorney, Agent, or Firm* — Rodney B. Carroll; Conley Rose, P.C.; Cherie Huseman

(57) ABSTRACT

A polymer composition comprising an ethylene alpha-olefin copolymer, wherein the polymer composition is characterized as having (a) a density in the range of from greater than about 0.910 g/cc to about 0.930 g/cc, as determined according to ASTM D1505; (b) a melt index in the range of from greater than about 0.5 g/10 min to about 3 g/10 min, as determined by ASTM D1238, Condition 190° C./2.16 kg; (c) a molecular weight distribution of from about 3.4 to about 12, as determined by gel permeation chromatography (GPC); (d) a weight average molecular weight of from greater than about 85 kg/mol to about 160 kg/mol, as determined by gel permeation chromatography (GPC); and (e) a z-average molecular weight of from greater than about 210 kg/mol to about 500 kg/mol, as determined by gel permeation chromatography (GPC).

16 Claims, 4 Drawing Sheets

(56) References Cited

U.S. PATENT DOCUMENTS

| | | | |
|---|---|---|---|
| 5,382,631 A † | 1/1995 | Stehling | |
| 5,399,636 A | 3/1995 | Alt et al. | |
| 5,401,817 A | 3/1995 | Palackal et al. | |
| 5,420,320 A | 5/1995 | Zenk et al. | |
| 5,436,304 A | 7/1995 | Griffin et al. | |
| 5,436,305 A | 7/1995 | Alt et al. | |
| 5,451,649 A | 9/1995 | Zenk et al. | |
| 5,455,314 A | 10/1995 | Burns et al. | |
| 5,496,781 A | 3/1996 | Geerts et al. | |
| 5,498,581 A | 3/1996 | Welch et al. | |
| 5,541,272 A | 7/1996 | Schmid et al. | |
| 5,554,795 A | 9/1996 | Frey et al. | |
| 5,563,284 A | 10/1996 | Frey et al. | |
| 5,565,175 A | 10/1996 | Hottovy et al. | |
| 5,565,592 A | 10/1996 | Patsidis et al. | |
| 5,571,880 A | 11/1996 | Alt et al. | |
| 5,575,979 A | 11/1996 | Hanson | |
| 5,594,078 A | 1/1997 | Welch et al. | |
| 5,631,203 A | 5/1997 | Welch et al. | |
| 5,631,335 A | 5/1997 | Alt et al. | |
| 5,654,454 A | 8/1997 | Peifer et al. | |
| 5,668,230 A | 9/1997 | Schertl et al. | |
| 5,705,478 A | 1/1998 | Boime | |
| 5,705,579 A | 1/1998 | Hawley et al. | |
| 6,187,880 B1 | 2/2001 | Welch et al. | |
| 6,239,235 B1 | 5/2001 | Hottovy et al. | |
| 6,262,174 B1 | 7/2001 | Cooper et al. | |
| 6,262,191 B1 | 7/2001 | Hottovy et al. | |
| 6,359,072 B1 † | 3/2002 | Whaley | |
| 6,469,103 B1 | 10/2002 | Jain et al. | |
| 6,509,427 B1 | 1/2003 | Welch et al. | |
| 6,608,000 B1 * | 8/2003 | Bamberger et al. | 502/113 |
| 6,833,415 B2 | 12/2004 | Kendrick et al. | |
| 6,908,968 B2 | 6/2005 | Jain et al. | |
| 7,026,494 B1 | 4/2006 | Yang et al. | |
| 7,094,857 B2 * | 8/2006 | Sukhadia et al. | 526/352 |
| 7,572,875 B2 † | 8/2009 | Jensen | |
| 8,039,556 B2 | 10/2011 | Krishnaswamy et al. | |
| 8,084,560 B2 | 12/2011 | Kolb et al. | |
| 8,153,243 B2 † | 4/2012 | Patel | |
| 2005/0203261 A1 * | 9/2005 | Sukhadia et al. | 526/160 |
| 2012/0059134 A1 | 3/2012 | Yang et al. | |
| 2012/0277380 A1 | 11/2012 | Karjala | |
| 2013/0029125 A1 | 1/2013 | Tse et al. | |

FOREIGN PATENT DOCUMENTS

| | | |
|---|---|---|
| WO | 9426816 | 11/1994 |
| WO | 9821274 A1 | 5/1998 |
| WO | 2005002744 | 1/2005 |
| WO | 2006115839 A1 | 11/2006 |
| WO | 2007061587 A1 | 5/2007 |
| WO | 2010034464 | 4/2010 |
| WO | 2011002868 | 1/2011 |
| WO | 2013007619 | 1/2013 |

OTHER PUBLICATIONS

Hieber, C. A., et al., "Some correlations involving the shear viscosity of polystyrene melts," 1989, pp. 321-332, vol. 28, No. 4, Rheologica Acta.

Hieber, C. A., et al., "Shear-Rate-Dependence Modeling of Polymer Melt Viscosity," Jul. 1992, pp. 931-938, vol. 32, No. 14, Polymer Engineering and Science.

Bird, R. Byron, et al., "Fluid Mechanics," Dynamics of Polymeric Liquids, vol. 1, Second Edition, 1987, cover page, publishing page, pp. xiii-xviii, and 171-172, John Wiley & Sons, Inc.

Dealy & Wissbrun, "Melt Rheology and its Role in Polymer Processing", pp. 368-369, (1990) by Van Nostrand Reinhold, New York.†

\* cited by examiner
† cited by third party

POLYMER FILMS HAVING IMPROVED HEAT SEALING PROPERTIES

CROSS-REFERENCE TO RELATED APPLICATIONS

Not applicable.

TECHNICAL FIELD

This disclosure relates to novel polymers. More specifically, this disclosure relates to novel polymers having improved thermal properties.

BACKGROUND

Polyolefins are plastic materials useful for making a wide variety of valued products due to their combination of stiffness, ductility, barrier properties, temperature resistance, optical properties, availability, and low cost. One of the most valued products is plastic films. In particular, polyethylene (PE) is the one of the largest volume polymers consumed in the world. It is a versatile polymer that offers high performance relative to other polymers and alternative materials such as glass, metal, or paper. Plastic films such as PE films are mostly used in packaging applications but they also find utility in the agricultural, medical, and engineering fields.

PE films are manufactured in a variety of grades that are usually differentiated by the polymer density such that PE films can be designated for example, low density polyethylene (LDPE), linear low density polyethylene (LLDPE), medium density polyethylene (MDPE), and high density polyethylene (HDPE), wherein each density range has a unique combination of properties making it suitable for a particular application.

Heat sealing is the major technique used for forming and closing flexible packages. Heat is used to rapidly activate a sealant layer comprised of a heat sealable material, usually a polymeric material. The temperature required to activate the heat sealable material and form a durable seal is termed the seal initiation temperature (SIT) and the ability of the seal to resist opening immediately after being formed is termed hot tack. The temperature range over which a durable seal can be formed and maintained is termed the hot tack window while the strength of the seal formed is termed the heat seal strength.

One factor in the use of these polymers as sealants is the thermal properties of the materials. Thus an ongoing need exists for polymers (e.g., PE) having improved thermal properties.

SUMMARY

Disclosed herein is a polymer composition comprising an ethylene alpha-olefin copolymer wherein the polymer composition is characterized as having (a) a density in the range of from greater than about 0.910 g/cc to about 0.930 g/cc, as determined according to ASTM D1505; (b) a melt index in the range of from greater than about 0.5 g/10 min to about 3 g/10 min. as determined according to ASTM D1238, Condition 190° C./2.16 kg; (c) a molecular weight distribution of from about 3.4 to about 12, as determined by gel permeation chromatography; (d) a weight average molecular weight of from greater than about 85 kg/mol to about 160 kg/mol, as determined by gel permeation chromatography; and (e) a z-average molecular weight of from greater than about 210 kg/mol to about 500 kg/mol, as determined by gel permeation chromatography.

Also disclosed herein is a fabricated film article comprising a polymer composition which comprises an ethylene alpha-olefin copolymer, wherein the polymer composition is characterized as having (a) a density in the range of from greater than about 0.910 g/cc to about 0.930 g/cc as determined according to ASTM D1505 (b) a melt index in the range of from greater than about 0.5 g/10 min to about 3 g/10 min as determined according to ASTM D1238, Condition 190° C./2.16 kg (c) a molecular weight distribution) of from about 3.4 to about 12 as determined by gel permeation chromatography (d) a weight average molecular weight, of from greater than about 85 kg/mol to about 160 kg/mol, as determined by gel permeation chromatography and (e) a z-average molecular weight of from greater than about 210 kg/mol to about 500 kg/mol, as determined by gel permeation chromatography such that the film article fabricated from the polymer composition is characterized as having a hot tack initiation temperature of less than about 96° C., as determined according to ASTM F1921-98, method A.

Also disclosed herein is a fabricated film article comprising a polymer composition which comprises an ethylene alpha-olefin copolymer wherein the polymer composition is characterized as having (a) a density in the range of from greater than about 0.910 g/cc to about 0.930 g/cc, as determined according to ASTM D1505 (b) a melt index in the range of from greater than about 0.5 g/10 min to about 3 g/10 min, as determined according to ASTM D1238, Condition 190° C./2.16 kg (c) a molecular weight distribution of from about 3.4 to about 12, as determined by gel permeation chromatography (d) a weight average molecular weight of from greater than about 85 kg/mol to about 160 kg/mol, as determined by gel permeation chromatography and (e) a z-average molecular weight of from greater than about 210 kg/mol to about 500 kg/mol, as determined by gel permeation chromatography such that the film article fabricated from the polymer composition is characterized as having (i) a hot tack initiation temperature of less than about 96° C., as determined according to ASTM F1921-98, method A, and (ii) a hot tack initiation temperature range of greater than about 20° C., as determined according to ASTM F1921-95, method A.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
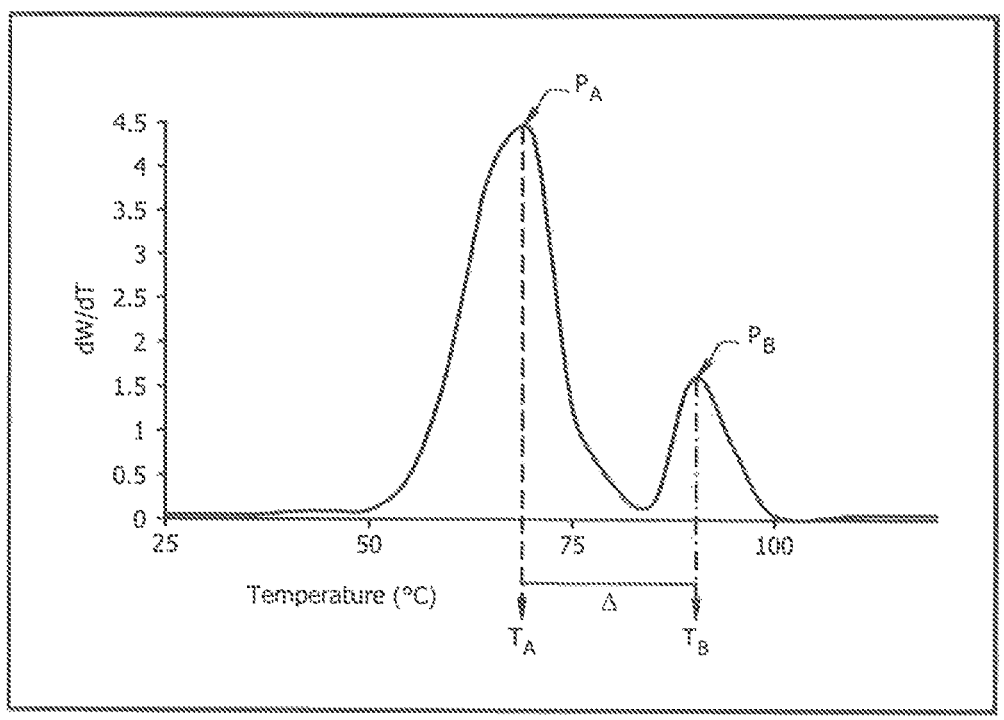
FIG. 1 is a depiction of an analytical temperature rising elution fraction profile for a polymer of the type disclosed herein.

Disclosed herein are polymers having improved thermal properties and methods of making using and same. Herein, the polymer refers both to a material collected as the product of a polymerization reaction (e.g., a reactor or virgin resin) and a polymeric composition comprising a polymer and one or more additives. In an embodiment, a monomer (e.g., ethylene) may be polymerized using the methodologies disclosed herein to produce a polymer of the type disclosed herein.

In an embodiment polymers of the type disclosed herein are characterized as metallocene-catalyzed polymers having improved thermal properties and designated PITs. In an embodiment, the polymer is a linear low-density polyethylene. Various features and properties of PITs are disclosed herein.

In an embodiment, a PIT of the type described herein may be prepared by any suitable methodology, for example by employing one or more catalyst systems, in one or more reactors, in solution, in slurry, or in the gas phase, and/or by varying the monomer concentration in the polymerization reaction, and/or by changing any/all of the materials or parameters involved in the production of the PITs, as will be described in more detail later herein.

The PIT of the present disclosure can be produced using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In an embodiment, any arrangement and/or any combination of reactors may be employed to produce the polymer of the present disclosure.

According to one embodiment, the polymerization reactor system may comprise at least one loop slurry reactor. Such reactors may comprise vertical or horizontal loops. Monomer, diluent, catalyst system, and optionally any comonomer may be continuously fed to a loop slurry reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for this separation step including but not limited to, flashing that may include any combination of heat addition and pressure reduction; separation by cyclonic action in either a cyclone or hydrocyclone; separation by centrifugation; or other appropriate method of separation.

Suitable slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another embodiment, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another embodiment, the polymerization reactor may comprise a solution polymerization reactor wherein the monomer is contacted with the catalyst composition by suitable stirring or other means. A carrier comprising an organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to temperature, pressure, type and quantity of catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness tests. Physical properties include, but are not limited to density, molecular weight, molecular weight distribution, melting temperature, glass transition temperature, temperature melt of crystallization, density, stereoregularity, crack growth, short chain branching, long chain branching and rheological measurements.

The concentrations of monomer, co-monomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

In an embodiment, a method of preparing a PIT comprises contacting an olefin (e.g., ethylene) monomer with a catalyst system under conditions suitable for the formation of a polymer of the type described herein. In an embodiment, the catalyst system comprises a transition-metal complex. The terms "catalyst composition," "catalyst mixture," "catalyst system," and the like, do not depend upon the actual product resulting from the contact or reaction of the components of the mixtures, the nature of the active catalytic site, or the fate of the co-catalyst, the catalyst, any olefin monomer used to prepare a precontacted mixture, or the activator-support, after combining these components. Therefore, the terms "catalyst composition," "catalyst mixture," "catalyst system," and the like, can include both heterogeneous compositions and homogenous compositions.

In an embodiment, a catalyst system suitable for the preparation of a PIT comprises at least one metallocene-containing compound. In an embodiment, the metallocene-containing compound is an unbridged metallocene, designated MTE-A. Herein, the term "metallocene" describes a compound comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands include hydrogen, therefore the description "substituted derivatives thereof" in this disclosure comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like.

In an embodiment, MTE-A is a compound that may be characterized by one of general formulas 1 or 2:

Formula 1

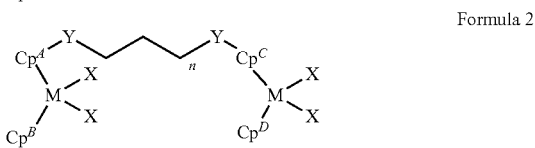

Formula 2 where each X is independently F, Cl, Br, I, methyl, benzyl, phenyl, H, $BH_4$, a hydrocarbyloxide group having up to 20 carbon atoms, a hydrocarbylamino group having up to 20 carbon atoms, a trihydrocarbylsilyl group having up to 20 carbon atoms, $OBR'_2$ wherein R' may be an alkyl group having up to 12 carbon atoms or an aryl group having up to 12 carbon atoms, and $SO_3R"$, wherein R" may be an alkyl group having up to 12 carbon atoms or an aryl group having up to 12 carbon atoms; Y is a $CR_2$ or $SiR_2$ group where R is hydrogen or a hydrocarbyl group; $Cp^A$, $Cp^B$, $Cp^C$, and $Cp^D$ are each independently a substituted or unsubstituted cyclopentadienyl group, indenyl group, or flourenyl group and where any substituent on $Cp^A$, $Cp^B$, $Cp^C$, and $Cp^D$ can be H, a hydrocarbyl group having up to 18 carbon atoms or a hydrocarbylsilyl group having up to 18 carbon atoms.

Nonlimiting examples of metallocene-containing compounds suitable for use in this disclosure are described in more detail in U.S. Pat. Nos. 4,939,217; 5,191,132; 5,210,352; 5,347,026; 5,399,636; 5,401,817; 5,420,320; 5,436,305; 5,451,649; 5,496,781; 5,498,581; 5,541,272; 5,554,795; 5,563,284; 5,565,592; 5,571,880; 5,594,078; 5,631,203; 5,631,335; 5,654,454; 5,668,230; 5,705,478; 5,705,579; 6,187,880; 6,509,427; 7,026,494, and U.S. Patent App. Nos. 20100190926 A1 and 20120059134, each of which is incorporated by reference herein in its entirety.

In an alternative embodiment, the metallocene-containing compound comprises a bridged metallocene compound hereinafter designated MTE-B. In an embodiment, MTE-B can be characterized by one of general formulas 3 or 4:

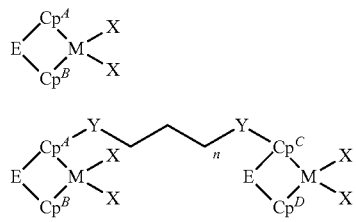

Formula 3

Formula 4 where M is Ti, Zr or Hf; each X is independently F, Cl, Br, I, methyl, phenyl, benzyl, H, $BH_4$, a hydrocarbyloxide group having up to 20 carbon atoms, a hydrocarbylamino group having up to 20 carbon atoms, a trihydrocarbylsilyl group having up to 20 carbon atoms, $OBR'_2$ wherein R' may be an alkyl group having up to 12 carbon atoms or an aryl group having up to 12 carbon atoms, or $SO_3R''$ wherein R'' may be an alkyl group having up to 12 carbon atoms or an aryl group having up to 12 carbon atoms; Y is a $CR_2$, $SiR_2$, or $R_2CCR_2$ group which may be linear or cyclic and where R is hydrogen or a hydrocarbyl group; $Cp^A$, $Cp^B$, $Cp^C$, and $Cp^D$ are each independently a substituted or unsubstituted cyclopentadienyl group, indenyl group, or flourenyl group and where any substituent on $Cp^A$, $Cp^B$, $Cp^C$, and $Cp^D$ can be H, a hydrocarbyl group having up to 18 carbon atoms or a hydrocarbylsilyl group having up to 18 carbon atoms. E represents a bridging group which may comprise (i) a cyclic or heterocyclic moiety having up to 18 carbon atoms, (ii) a group represented by the general formula $E^A R^{3A} R^{4A}$, wherein $E^A$ is C, Si, Ge, or B, and $R^{3A}$ and $R^{4A}$ are independently H or a hydrocarbyl group having up to 18 carbon atoms, (iii) a group represented by the general formula $—CR^{3B}R^{4B}—CR^{3C}R^{4C}—$, wherein $R^{3B}$, $R^{4B}$, $R^{3C}$, and $R^{4C}$ are independently H or a hydrocarbyl group having up to 10 carbon atoms, or (iv) a group represented by the general formula $SiR_2—CR_2$ where X is Si or C and R is a hydrogen or hydrocarbyl group; or $—SiR^{3D}R^{4D}—SiR^{3E}R^{4E}—$, wherein $R^{3D}$, $R^{4D}$, $R^{3E}$, and $R^{4E}$ are independently H or a hydrocarbyl group having up to 10 carbon atoms, and wherein at least one of $R^{3A}$, $R^{3B}$, $R^{4A}$, $R^{4B}$, $R^{3C}$, $R^{4C}$, $R^{3D}$, $R^{4D}$, $R^{3E}$, $R^{4E}$, or the substituent on Cp, $Cp_1$, or $Cp_2$, is (1) a terminal alkenyl group having up to 12 carbon atoms or (2) a dinuclear compound wherein each metal moiety has the same structural characteristic as MTE-B. In some embodiments the catalyst comprises at least two metallocene-containing compounds of the typed disclosed herein.

The PIT may comprise additives. Examples of additives include, but are not limited to, antistatic agents, colorants, stabilizers, nucleators, surface modifiers, pigments, slip agents, antiblocks, tackifiers, polymer processing aids, and combinations thereof. Such additives may be used singularly or in combination and may be contacted with the polymer before, during, or after preparation of the PIT as described herein. Such additives may be added via any suitable technique, for example during an extrusion or compounding step such as during pelletization or subsequent processing into an end use article.

In an embodiment, the PIT comprises polyethylene, for example metallocene-catalyzed polyethylene. In an embodiment, the PIT comprises a polyethylene homopolymer, for example a metallocene-catalyzed polyethylene homopolymer. It is to be understood that an inconsequential amount of comonomer may be present in the polymers disclosed herein and the polymer still be considered a homopolymer. Herein an inconsequential amount of a comonomer refers to an amount that does not substantively affect the properties of the polymer disclosed herein. For example a comonomer can be present in an amount of less than about 1.0 wt. %, 0.5 wt. %, 0.1 wt. %, or 0.01 wt. % based on the total weight of polymer.

In an alternative embodiment, the PIT comprises a polyethylene copolymer, also termed an ethylene (alpha-olefin) copolymer, for example a metallocene-catalyzed polyethylene copolymer. Examples of suitable comonomers include without limitation unsaturated hydrocarbons having from 3 to 20 carbon atoms such as propylene, 1-butene, 1-pentene, 1-hexene, 3-methyl-1-butene, 4-methyl-1-pentene, 1-heptene, 1-octene, 1-nonene, 1-decene, and mixtures thereof.

In an embodiment, the PIT has a weight average molecular weight ($M_w$) of from about 80 kg/mol to about 170 kg/mol, alternatively from about 85 kg/mol to about 145 kg/mol, alternatively from about 90 kg/mol to about 140 kg/mol, or alternatively from about 85 kg/mol to about 160 kg/mol. In an embodiment, the PIT has a number average molecular weight ($M_n$) of from about 7 kg/mol to about 50 kg/mol, alternatively from about 9 kg/mol to about 35 kg/mol, or alternatively from about 10 kg/mol to about 32 kg/mol. In an embodiment, the PIT has a z-average molecular weight ($M_z$) of from greater than about 210 kg/mol to about 500 kg/mol, alternatively from about 220 kg/mol to about 470 kg/mol, or alternatively from about 230 kg/mol to about 450 kg/mol. The weight average molecular weight may be calculated according to equation 1:

$$\overline{M}_w = \frac{\sum_i N_i M_i^2}{\sum_i N_i M_i} \qquad (1)$$

where $N_i$ is the number of molecules of molecular weight $M_i$. All molecular weight averages are expressed in kilogram per mole (kg/mol) or kiloDaltons and are determined by gel permeation chromatography. The number average molecular weight is the common average of the molecular weights of the individual polymers and may be calculated according to equation (2).

$$\overline{M}_n = \frac{\sum_i N_i M_i}{\sum_i N_i} \qquad (2)$$

The z-average molecular weight is a higher order molecular weight average which is calculated according to equation (3)

$$M_z = \Sigma n_i M_i^3 / \Sigma n_i M_i^2 \; (kg \, mol^{-1}) \qquad (3)$$

where $n_i$ is the amount of substance of species i and $M_i$ is the molar mass of species.

The PIT may further be characterized by a molecular weight distribution (MWD) of greater than or equal to 3.3, alternatively from about 3.4 to about 12, alternatively from about 3.5 to about 11, or alternatively from about 3.6 to about 10. The MWD refers to the ratio of the $M_w$ to the $M_n$, which is also termed the polydispersity index (PDI) or more simply polydispersity.

In an embodiment, the PIT is characterized as a substantially linear polymer having less than about 22 branches per 1000 carbon atoms, alternatively less than about 20 branches per 1000 carbon atoms or alternatively less than about 19 branches per 1000 carbon atoms.

The PIT may be characterized as having a density of less than about 0.945 g/cc, alternatively from about 0.910 g/cc to about 0.940 g/cc, alternatively from about 0.912 g/cc to about 0.935 g/cc, alternatively from about 0.913 g/cc to about 0.925 g/cc, or alternatively from greater than about 0.910 g/cc to about 0.930 g/cc as determined in accordance with ASTM D 1505.

The PIT may be characterized as having a melt index (MI) of from greater than about 0.5 g/10 min. to about 3.0 g/10 min., alternatively from about 0.6 g/10 min. to about 2.5 g/10 min., or alternatively from about 0.7 g/10 min. to about 2.0 g/10 min. The MI refers to the amount of a polymer which can be forced through an extrusion rheometer orifice of 0.0825 inch diameter when subjected to a force of 2.16 kilograms in ten minutes at 190° C., as determined in accordance with ASTM D 1238.

The PIT may be characterized as having a high-load melt index (HLMI) of from about 10 g/10 min. to about 28 g/10 min., alternatively from about 11 g/10 min. to about 27 g/10 min., or alternatively from about 12 g/10 min. to about 26 g/10 min. The HLMI refers to the amount of a polymer which can be forced through an extrusion rheometer orifice of 0.0825 inch diameter when subjected to a force of 21.6 kilograms in ten minutes at 190° C., as determined in accordance with ASTM D 1238.

The PIT may be characterized as having ratio of HLMI to MI of from about 16 to about 30, alternatively from about 16.5 to about 28 or alternatively from about 17 to about 26.

In an embodiment, the PIT has a zero shear viscosity, Eta(0), value of from about 3000 Pa·s to about 25000 Pa·s, alternatively from about 4000 Pa·s to about 20000 Pa·s, or alternatively from about 5000 Pa·s to about 18000 Pa·s when the dynamic complex viscosity versus frequency scan are fitted to the Carreau-Yasuda, equation (4), with an n=0.1818 value:

$$E = E_o[1 + (T_\xi \dot{\gamma})^a]^{\frac{n-1}{a}} \quad (4)$$

where
$E$=viscosity (Pa·s)
$\dot{\gamma}$=shear rate (1/s)
a=rheological breadth parameter
$T_\xi$=relaxation time (s) [describes the location in time of the transition region]
$E_o$=zero shear viscosity (Pa·s) [defines the Newtonian plateau]
n=power law constant [defines the final slope of the high shear rate region].

To facilitate model fitting, the power law constant n is held at a constant value. Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987), each of which is incorporated by reference herein in its entirety.

The zero shear viscosity refers to the viscosity of the polymeric composition at a zero shear rate and is indicative of the materials molecular structure. Further, for polymer melts, the zero shear viscosity is often a useful indicator of processing attributes such as the melt strength of polymer melts in polymer processes. For example, the higher the zero shear viscosity, the better the melt strength.

In an embodiment, the PIT has a Carreau-Yasuda "a" value of from about 0.400 to about 0.680, alternatively from about 0.420 to about 0.650, or alternatively from about 0.450 to about 0.630 wherein the dynamic complex viscosity versus frequency scan are fitted to the Carreau-Yasuda equation with an n=0.1818 value.

In an embodiment, a PIT of the type disclosed herein is characterized by an analytical temperature rising elution fractionation (ATREF) profile of the type depicted in FIG. 1, or alternatively substantially similar thereto. In order to generate an ATREF profile, a sample of the polymer to be analyzed is dissolved in a suitable hot solvent (e.g., trichlorobenzene) and allowed to crystallized in a column containing an inert support (stainless steel shot) by slowly reducing the temperature. The column is typically equipped with both a refractive index detector and a differential viscometer detector. An ATREF chromatogram curve is then generated by eluting the crystallized polymer sample from the column by slowly increasing the temperature of the eluting solvent (trichlorobenzene). In an embodiment, the elution fractionation temperature range for a polymer of the type disclosed herein (i.e., PIT) is from about 20° C. to about 110° C.; alternatively from about 20° C. to about 108° C. or alternatively from about 20° C. to about 105° C.

Referring to FIG. 1, a PIT of the type disclosed herein may display an ATREF profile which is a plot of the molecular weight characteristics of the polymer (e.g., dW/dT) as a function of temperature that contains at least two components that elute at different temperatures resulting in at least two peaks designated peak A, $P_A$, and peak B, $P_B$. Herein the elution temperature corresponds to a peak observed on an ATREF curve as determined from temperature rising elution fractionation in the range of from about 20° C. to about 110° C. An observed peak in the ATREF profile corresponds to a substantial weight percent of a crystallized polymer portion based on the total amount of crystallizable polymer portions for the polymer as a whole. Polymers of the type disclosed herein (i.e., PITs) with crystallizable polymer portions may be characterized as having measurable crystallized polymer portions at several different peak temperatures (i.e., multiple peaks). In an embodiment, an ATREF profile of the type disclosed herein comprise two measurable crystallized polymer portions which in sum account for greater than about 90%, alternatively 91, 92, 93, 94, 95, 96, 97, 98, or 99% of the crystallizable polymer portions present in the polymer as a whole. It is contemplated that additional peaks (e.g., shoulders, humps and doublets) may be present in the ATREF profile of a polymer of the type disclosed herein. Alternately, additional peaks may also be present in between the lowest temperature peak and the highest temperature peak, in which case the lowest temperature peak shall be designated as $P_A$ and the highest temperature peak shall be designated as $P_B$.

In an embodiment, $P_A$ has an elution temperature designated $T_A$ and $P_B$ has an elution temperature designated $T_B$ where the difference between $T_A$ and $T_B$, designated Δ, is equal to greater than about 23, alternatively from about 23 to about 35, or alternatively from about 23 to about 33.

In an embodiment, a PIT is fabricated into a film. The films of this disclosure may be produced using any suitable methodology. In an embodiment, the polymers (i.e., PITs) are formed into films through a blown film process. In an embodiment, the blown film samples may be prepared using the following conditions: 100 mm (4 inch) die diameter, 1.5 mm (0.060) inch die gap, 37.5 mm (1.5 inch) diameter single-screw extruder fitted with a barrier screw with a Maddock mixing section at the end (L/D=24, 2.2:1 compression ratio), 115 RPM screw speed [about 27 kg/h (60 lb/h) output rate], 2.5:1 blow up ratio (BUR), "in pocket" bubble with "freeze line height" (FLH) between 20-28 cm (8-11 inch), 190° C. (375° F.) barrel and die set temperatures and 1m (25 micron) thick film. Cooling may be accomplished with a Dual Lip air ring using ambient (laboratory) air at about 25° C. (75-80° F.).

The films formed from polymers of this disclosure (i.e., PITs) may be of any thickness desired by the user. Alternatively, the PIT may be formed into a film having a thickness of from about 0.1 mils to about 5 mils, alternatively from about 0.2 mils to about 4.0 mils, alternatively from about 0.3 mils to about 3.0 mils.

In an embodiment, the films formed from the PITs of this disclosure have a dart drop strength ranging from about 500 g/mil to about 2000 g/mil, alternatively from about 700 g/mil to about 1700 g/mil or alternatively from about 900 g/mil to about 1400 g/mil as measured in accordance with ASTM D1709 Method A using a blown film test specimen having a 1.0 mil thickness. The dart drop strength refers to the weight required to cause 50% of tested films to fail by impact from a falling dart under specified test conditions. Specifically, one method employs the use of a dart having a 38 mm (1.5 in) head diameter dropped from a height of 0.66 m (26.1 in).

In an embodiment, the films formed from the PITs of this disclosure have an Elmendorf tear strength in the machine direction (MD) of from about 70 g/mil to about 300 g/mil, alternatively from about 90 g/mil to about 250 g/mil, or alternatively from about 100 g/mil to about 200 g/mil and an Elmendorf tear strength in the transverse direction (TD) ranging from about 250 g/mil to about 650 g/mil, alternatively from about 280 g/mil to about 550 g/mil, or alternatively from about 300 g/mil to about 500 g/mil as measured in accordance with ASTM D1922 using a blown film test specimen having a 1.0 mil thickness.

In an embodiment, the films formed from PITs of the type disclosed herein have a Seal Initiation Temperature (SIT) of from about 85° C. to about 105° C., alternatively from about 88° C. to about 103° C. or alternatively from about 89° C. to about 100° C., a Hot Tack Initiation Temperature (HTIT) of less than about 100° C., alternatively less than about 96° C., alternatively less than about 95° C., alternatively less than about 93° C. and a Hot Tack Initiation Temperature Range (HTR) of greater than about 20° C., alternatively greater than about 23° C., or alternatively greater than about 25° C. Herein, the SIT refers to the temperature at which the sealed film product achieves a seal strength of 0.3 lb/inch, HTIT refers to the temperature at which the hot tack strength is equal to or greater than 0.225 lb/inch and the HTR refers to the range of temperatures in which the hot tack strength is equal or greater than 0.225 lb/in. The HTR is determined by subtracting the lowest temperature at which hot tack strength of 0.225 lb/inch is achieved from the highest temperature at which hot tack strength of 0.225 lb/inch is achieved using the hot tack strength versus temperature curve. The SIT and hot tack window may be determined using a heat seal tester in accordance with ASTM F 1921-98 method A.

PITs of the type disclosed herein may be formed into articles of manufacture or end use articles using any suitable methodology such as extrusion, blow molding, injection molding, fiber spinning, thermoforming, and casting. For example, the PIT may be extruded into a sheet, which is then thermoformed into an end use article such as a container, a cup, a tray, a pallet, a toy, or a component of another product.

EXAMPLE 1

The heat sealing properties of PITs of the type disclosed herein were investigated. Specifically the sealing properties were determined as follows: using a Theller Engineering Heat Seal Test System (Method A for both Hot Tack and Heat Seal measurements) with settings for 3 replicates of a seal width: 1.0 inch; grip separation rate: 8 in/min; dwell time=1,000 msec (1 sec); seal pressure=60 psi and peel speed=200 cm/min (for hot tack) or 30 cm/min (for seal test).

Hot Tack Initiation Temperature (HTIT) was defined as where the hot tack strength of 1 N/25 mm (0.225 lb/in) at 250 msec cooling time was achieved. Seal Initiation Temperature (SIT) was defined as where the Ultimate Seal Strength of 1.3 N/25 mm (0.3 lb/in) was achieved. The Hot Tack Initiation Temperature Range (HTR) was defined as the temperature window in which the Hot Tack Strength of 0.225 lb/in or higher was achieved and was readily determined from the Force vs. Sealing Temperature curve using a 250 msec cooling time.

Inventive samples (i.e., PITs) were prepared in a continuous slurry loop process with liquid isobutane as diluent. These pilot plant polymerizations were conducted in a 27 gallon reactor operating at about 590 psig and about 79.4° C. (about 175° F.). Inventive resins 1 through 20 were prepared using a metallocene mixture comprised of a MTE-B+MTE-A in a weight ratio ranging from 2:1 to 5:1=MTE-B:MTE-A. The metallocenes were fed to the reactor as a hydrocarbon solution either simultaneously or in a single solution at the prescribed ratio via a precontactor vessel. The remaining inventive resins were prepared with a mixture of three metallocenes, two MTE-B type metallocenes and 1 MTE-A type metallocene. The three metallocenes were fed to the reactor in such a manner to achieve a final weight ratio composition of 2:1:0.14 to 0.20=MTE-B1/MTE-A/MTE-B2.

The polymer was removed from the reactor at a rate of about 22-25 lbs per hour employing a total metallocene concentration ranging from 0.6 to 1.5 ppm in the reactor. The polymer production rate was maintained by feeding ethylene at 22-32 lbs per hour and with the reactor operated to have a residence time of about 1.2 hrs. The ethylene concentration was ranged from 10.7 to 13.9 mol % and polymer melt index and density were controlled by addition of hydrogen (0.4 to 5.97 mili lbs per hour) and hexene (3.6 to 6.4 lbs per hour) to the reactor.

The properties of the Inventive resins were compared to four Comparative samples. The basic properties of all these resins are shown in Table 1. All the resin samples in Table 1 were formed into blown films of 1 mil (25 micron) thickness and the HTIT, HTR and SIT properties tested. These results are tabulated in Table 2. The thermal properties of the films were tested and these results are presented in Table 3. Comparative samples COMP 1, COMP 2 and COMP 4 are metallocene catalyst based polyethylene which are commercially available from Chevron Phillips Chemical Company LP. COMP 3 is a Ziegler-Natta catalyzed polyethylene.

TABLE 1

| RESIN ID | DENSITY (g/cc) | MI (dg/min) | HLMI (dg/min) | HLMI/MI | Eta(0) (Pa.s) | a | Mn (kg/mol) | Mw (kg/mol) | Mz (kg/mol) | Mw/Mn |
|---|---|---|---|---|---|---|---|---|---|---|
| INV 1 | 0.917 | 1.02 | 25.3 | 24.8 | 5.91E+03 | 0.558 | 17.20 | 118.00 | 263.00 | 6.80 |

TABLE 1-continued

| RESIN ID | DENSITY (g/cc) | MI (dg/min) | HLMI (dg/min) | HLMI/ MI | Eta(0) (Pa.s) | a | Mn (kg/mol) | Mw (kg/mol) | Mz (kg/mol) | Mw/Mn |
|---|---|---|---|---|---|---|---|---|---|---|
| INV 2 | 0.917 | 1.02 | 25.3 | 24.8 | 6.02E+03 | 0.593 | 18.20 | 119.00 | 265.00 | 6.50 |
| INV 3 | 0.915 | 1.01 | 17.7 | 17.5 | 5.63E+03 | 0.626 | 31.80 | 128.00 | 236.00 | 4.00 |
| INV 4 | 0.915 | 1.10 | 25.2 | 22.9 | 7.94E+03 | 0.541 | 32.30 | 120.83 | 252.13 | 3.74 |
| INV 5 | 0.914 | 1.00 | 21.7 | 21.7 | 8.58E+03 | 0.582 | 20.12 | 119.71 | 249.93 | 5.95 |
| INV 6 | 0.914 | 1.00 | 21.7 | 21.7 | 8.40E+03 | 0.580 | 20.09 | 121.33 | 254.89 | 6.04 |
| INV 7 | 0.915 | 1.00 | 26.4 | 26.4 | 6.61E+03 | 0.608 | 20.21 | 115.16 | 240.28 | 5.70 |
| INV 8 | 0.916 | 0.70 | 14.1 | 19.8 | 1.03E+04 | 0.582 | 15.79 | 128.69 | 251.10 | 8.15 |
| INV 9 | 0.914 | 0.80 | 15.8 | 19.0 | 8.97E+03 | 0.592 | 17.37 | 125.89 | 240.02 | 7.25 |
| INV 10 | 0.913 | 0.95 | 18.5 | 19.5 | 6.91E+03 | 0.631 | 18.39 | 123.50 | 226.27 | 6.72 |
| INV 11 | 0.922 | 2.60 | nm | nm | 3.12E+03 | 0.617 | 9.90 | 92.39 | 240.69 | 9.33 |
| INV 12 | 0.920 | 1.27 | nm | nm | 5.96E+03 | 0.584 | 15.56 | 109.64 | 254.22 | 7.05 |
| INV 13 | 0.915 | 1.07 | nm | nm | 7.04E+03 | 0.562 | 17.68 | 115.99 | 252.77 | 6.56 |
| INV 14 | 0.915 | 1.02 | nm | nm | 8.10E+03 | 0.563 | 16.60 | 121.06 | 252.40 | 7.29 |
| INV 15 | 0.912 | 0.78 | nm | nm | 1.22E+04 | 0.456 | 19.07 | 127.50 | 259.88 | 6.69 |
| INV 16 | 0.914 | 0.73 | nm | nm | nm | nm | nm | nm | nm | nm |
| INV 17 | 0.919 | 0.80 | nm | nm | 9.84E+03 | 0.535 | 21.41 | 126.07 | 281.56 | 5.89 |
| INV 18 | 0.917 | 1.03 | nm | nm | 8.00E+03 | 0.548 | 21.51 | 120.50 | 275.30 | 5.60 |
| INV 19 | 0.916 | 0.85 | nm | nm | 1.18E+04 | 0.515 | 22.25 | 133.59 | 294.34 | 6.00 |
| INV 20 | 0.917 | 0.43 | nm | nm | 2.24E+04 | 0.436 | 20.26 | 153.68 | 402.02 | 7.59 |
| INV 21 | 0.918 | 0.64 | nm | nm | 1.68E+04 | 0.443 | 13.81 | 141.56 | 412.64 | 10.25 |
| INV 22 | 0.916 | 0.69 | nm | nm | 1.60E+04 | 0.438 | 13.23 | 139.72 | 428.85 | 10.56 |
| COMP 1 | 0.916 | 1.40 | 22.0 | 15.7 | 6.19E+03 | 0.604 | 46.58 | 111.75 | 190.15 | 2.40 |
| COMP 2 | 0.916 | 1.40 | 22.0 | 15.7 | 6.19E+03 | 0.604 | 46.58 | 111.75 | 190.15 | 2.40 |
| COMP 3 | 0.916 | 0.85 | 23 | 27 | 1.30E+04 | 0.385 | 40.00 | 134.00 | 465.00 | 3.35 |
| COMP 4 | 0.918 | 1.00 | 16.0 | 16 | 7.99E+03 | 0.604 | 47.50 | 112.91 | 197.00 | 2.38 | nm - not measured

TABLE 2

| RESIN ID | DENSITY (g/cc) | HOT TACK INITIATION TEMPERATURE (HTIT), °C. | HOT TACK INITIATION TEMPERATURE RANGE (HTR), °C. | Seal Tack Initiation (C.) |
|---|---|---|---|---|
| INV 1 | 0.917 | 93 | 23 | 92 |
| INV 2 | 0.917 | 93 | 23 | 92 |
| INV 3 | 0.915 | 94 | 29 | 91 |
| INV 4 | 0.915 | 88 | 38 | 85 |
| INV 5 | 0.914 | 92 | 25 | 91 |
| INV 6 | 0.914 | 91 | 28 | 89 |
| INV 7 | 0.915 | 85 | 38 | 85 |
| INV 8 | 0.916 | 96 | 31 | 95 |
| INV 9 | 0.914 | 94 | 29 | 91 |
| INV 10 | 0.913 | 93 | 40 | 91 |
| INV 11 | 0.922 | 94 | 45 | 105 |
| INV 12 | 0.920 | 91 | 40 | 105 |
| INV 13 | 0.915 | 85 | 50 | 95 |
| INV 14 | 0.915 | 85 | 50 | 91 |
| INV 15 | 0.912 | 85 | 45 | 92 |
| INV 16 | 0.914 | 91 | 45 | 87 |
| INV 17 | 0.919 | 90 | 50 | 100 |
| INV 18 | 0.917 | 86 | 44 | 95 |
| INV 19 | 0.916 | 90 | 45 | 92 |
| INV 20 | 0.917 | 90 | 55 | 96 |
| INV 21 | 0.918 | 90 | 65 | 98 |
| INV 22 | 0.916 | 92 | 63 | 100 |
| COMP 1 | 0.916 | 98 | 29 | 91 |
| COMP 2 | 0.916 | 98 | 23 | 92 |
| COMP 3 | 0.916 | 103 | 19 | 89 |
| COMP 4 | 0.918 | 98 | 16 | 95 |

TABLE 3

| RESIN ID | DENSITY (g/cc) | MI (dg/min) | HLMI (dg/min) | HLMI/MI | Dart Impact (g) | Spencer Impact (J) | MD Tear (g) | TD Tear (g) | Haze (%) | Clarity (%) | TEDD (ft. lb) |
|---|---|---|---|---|---|---|---|---|---|---|---|
| INV 1 | 0.917 | 1.02 | 25.3 | 24.8 | 1305 | 1.68 | 132 | 388 | 6.6 | 97.6 | 0.10 |
| INV 2 | 0.917 | 1.02 | 25.3 | 24.8 | 1355 | 1.58 | 166 | 317 | 7.9 | 99.0 | 0.09 |
| INV 3 | 0.915 | 1.01 | 17.7 | 17.5 | 1370 | 1.68 | 157 | 330 | 5.0 | 98.6 | >6.5 |
| INV 4 | 0.915 | 1.10 | 25.2 | 22.9 | 621 | 1.61 | 285 | 354 | 5.0 | 98.9 | 3.72 |
| INV 5 | 0.914 | 1.00 | 21.7 | 21.7 | 1181 | 1.76 | 142 | 401 | 5.2 | 94.1 | 3.79 |
| INV 6 | 0.914 | 1.00 | 21.7 | 21.7 | 1320 | 1.66 | 126 | 372 | 4.8 | 94.1 | 3.93 |
| INV 7 | 0.915 | 1.00 | 26.4 | 26.4 | 1223 | 1.66 | 197 | 384 | 5.0 | 94.0 | 3.54 |
| INV 8 | 0.916 | 0.70 | 14.1 | 19.8 | 1256 | 1.40 | 136 | 359 | 4.4 | 94.0 | 4.07 |
| INV 9 | 0.914 | 0.80 | 15.8 | 19.0 | 1175 | 1.72 | 160 | 379 | 4.0 | 94.1 | 4.50 |
| INV 10 | 0.913 | 0.95 | 18.5 | 19.5 | >1400 | 1.71 | 208 | 354 | 5.3 | 94.3 | 4.40 |
| INV 11 | 0.922 | 2.60 | nm | nm | 594 | nm | 158 | 470 | nm | nm | nm |
| INV 12 | 0.920 | 1.27 | nm | nm | 785 | nm | 143 | 497 | nm | nm | nm |
| INV 13 | 0.915 | 1.07 | nm | nm | 1105 | nm | 154 | 417 | nm | nm | nm |
| INV 14 | 0.915 | 1.02 | nm | nm | 1102 | nm | 129 | 400 | nm | nm | nm |
| INV 15 | 0.912 | 0.78 | nm | nm | 1081 | nm | 90 | 379 | nm | nm | nm |
| INV 16 | 0.914 | 0.73 | nm | nm | 1183 | nm | 165 | 384 | nm | nm | nm |
| INV 17 | 0.919 | 0.80 | nm | nm | 1068 | nm | 142 | 445 | nm | nm | nm |
| INV 18 | 0.917 | 1.03 | nm | nm | 1144 | nm | 173 | 439 | nm | nm | nm |
| INV 19 | 0.916 | 0.85 | nm | nm | 1154 | nm | 135 | 440 | nm | nm | nm |
| INV 20 | 0.917 | 0.43 | nm | nm | 1053 | nm | 89 | 515 | nm | nm | nm |
| INV 21 | 0.918 | 0.64 | nm | nm | 919 | nm | 106 | 507 | nm | nm | nm |
| INV 22 | 0.916 | 0.69 | nm | nm | 804 | nm | 101 | 500 | nm | nm | nm |
| COMP 1 | 0.916 | 1.40 | 22.0 | 15.7 | >1400 | 1.22 | 261 | 405 | 3.8 | 94.3 | No break |
| COMP 2 | 0.916 | 1.40 | 22.0 | 15.7 | >1400 | 1.36 | 255 | 373 | 3.8 | 94.0 | No break |
| COMP 3 | 0.916 | 0.85 | 23 | 27 | 239 | 0.32 | 400 | 750 | 5.6 | 99.3 | nm |
| COMP 4 | 0.918 | 1.00 | 16.0 | 16 | 1389 | 1.03 | 208 | 307 | 6.1 | 99.5 | 1.0 | nm - not measured

Referring to Table 3, haze is the cloudy appearance of a material caused by light scattered from within the material or from its surface. The haze of a material can be determined in accordance with ASTM D1003. The TEDD is the total energy dart drop strength (TEDD). The TEDD measures the total failure energy absorbed by a film specimen impacted by a falling dart under specified test conditions. Typically, a 38.1 mm (1.5 in) diameter hemispherical head dart is dropped from 66 cm (26 in) and impacts a test specimen. After passing through the test specimen, the dart passes through a speed trap made of a pair of photoelectric sensors that measure the time it takes for the dart to cover a given distance. The time it takes for the dart to pass through the speed trap after passing through the specimen is referred to as the test-fall time, while the time through the speed trap without a specimen is called the free-fall time. The energy absorbed by the specimen is equated to the loss of kinetic energy of the dart and is determined using the formula: $E=(m/2\ g)[d^2(1/t_1^2+1/t_2^2)+(g^2/4)(t_1^2-t_2^2)]$ where E is the energy required to rupture the specimen (J), m is the mass of the dart (kg), g is the gravitational constant (9.81 m/s$^2$), d is the distance between the photoelectric sensors (m), $t_1$ is the free-fall time (s), and $t_2$ is the test-fall time (s).

Figure 2:
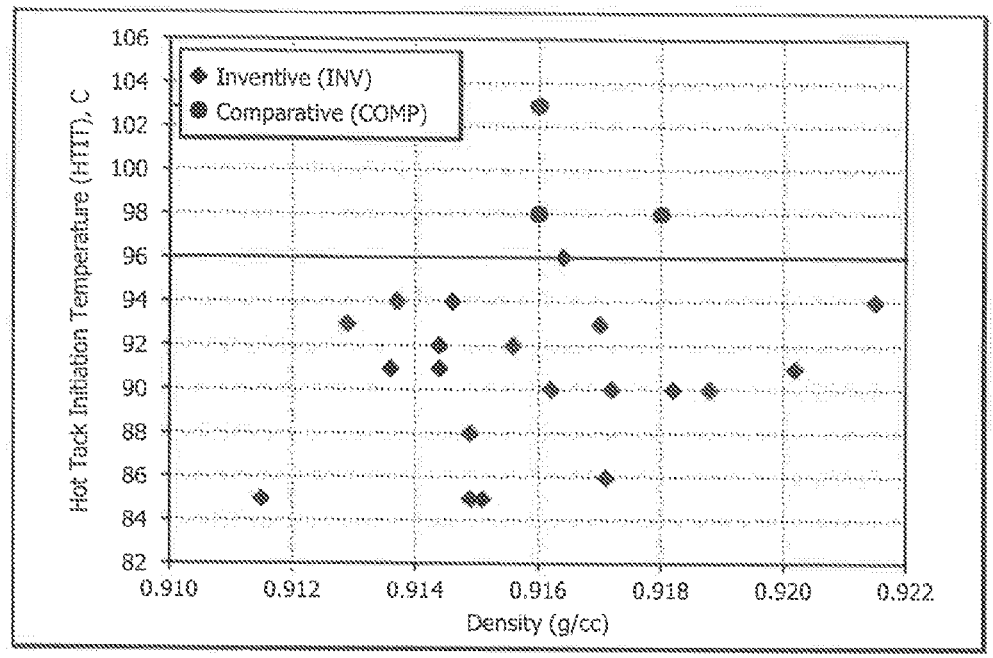
FIG. 2 is a plot of the hot tack initiation temperature as a function of resin density for the indicated samples.
Figure 3:
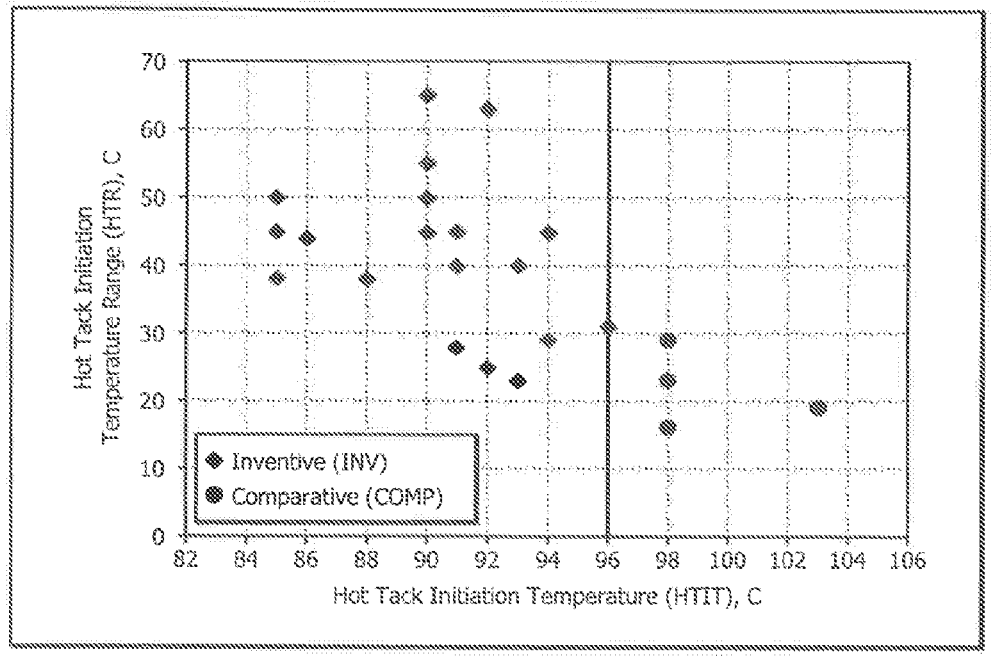
FIG. 3 is a plot of the hot tack initiation temperature range as a function of the hot tack initiation temperature for the indicated samples.
Figure 4:
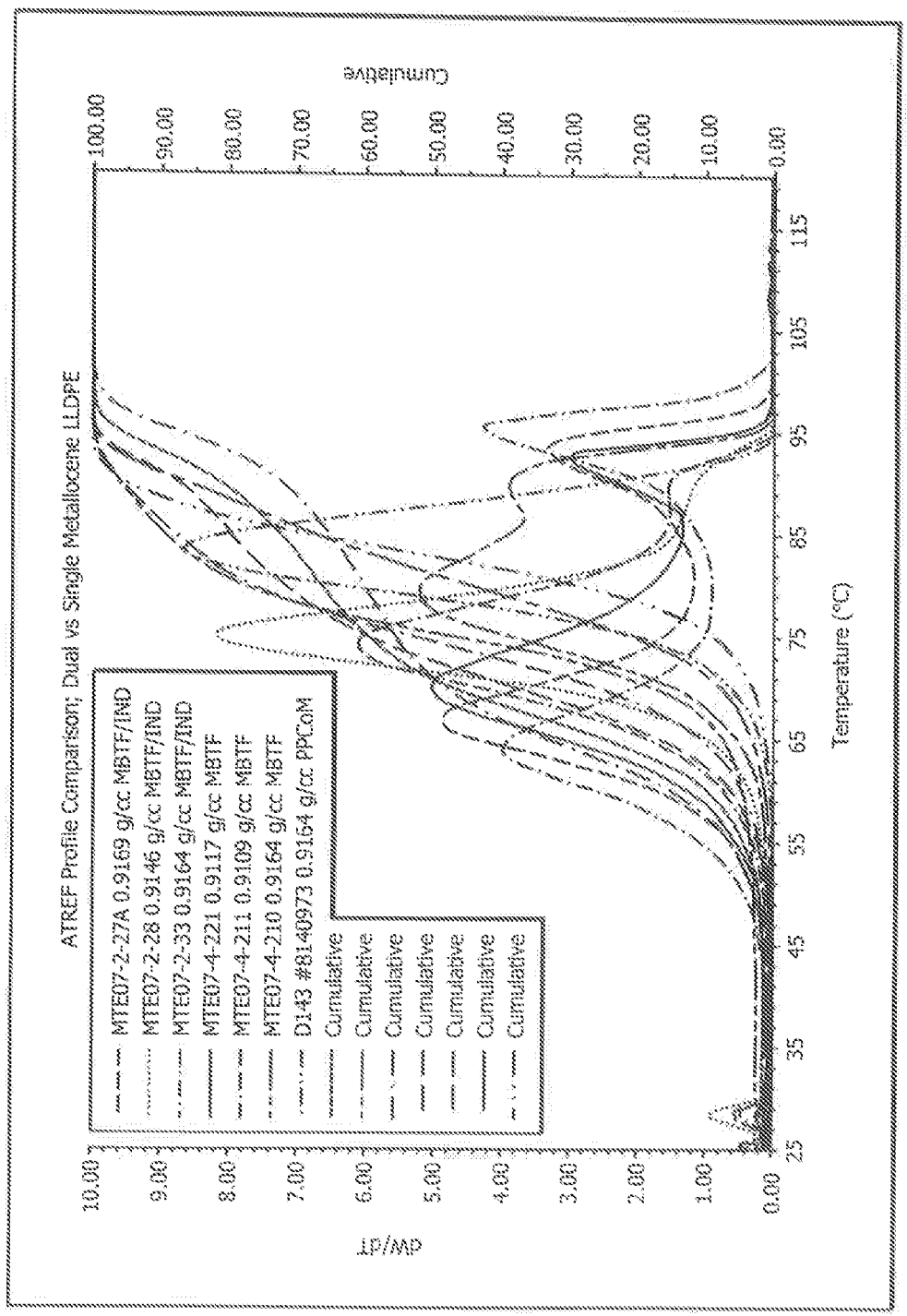
FIGS. 4 and 5 are analytical temperature rising elution fractionation profiles for the samples from example 1.
Figure 5:
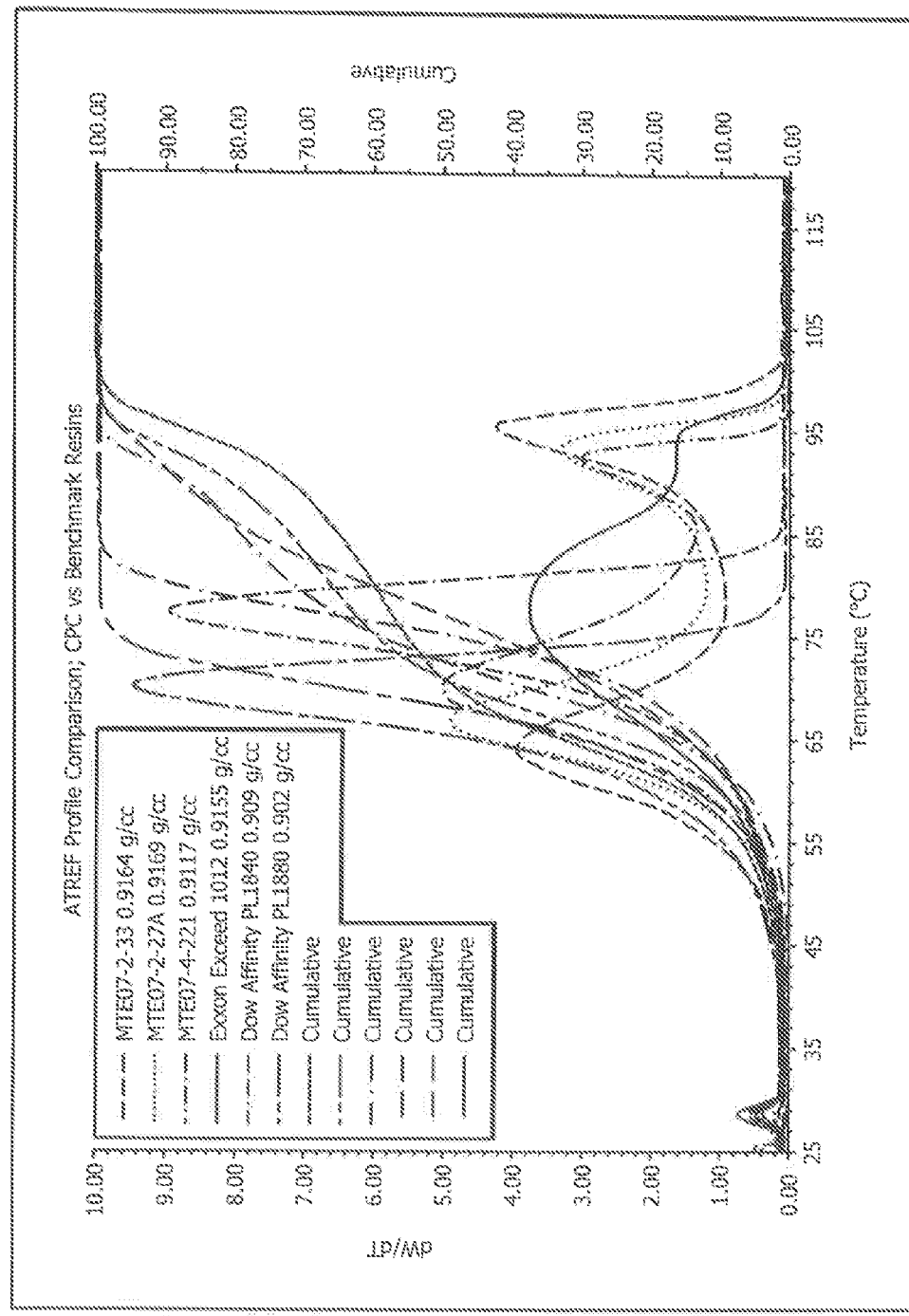

The difference in the range of hot tack initiation temperatures may be attributable to heterogeneous short chain branching distribution of the PIT samples. FIG. 2 is a plot of the HTIT of inventive (i.e., PIT) and comparative films as a function of resin density while FIG. 3 is a plot of HTR) of inventive (i.e., PIT) and comparative films as a function of the HTIT. The ATREF profiles of the samples from Table 1 are presented in FIGS. 4 and 5. The ATREF data suggests the PIT samples contain a lower melting, more branched population of polymer chains that result in the observed decrease in the hot tack initiation temperature. The results demonstrate PITs of the type disclosed herein form films having decreased hot tack initiation temperatures but retaining seal strengths comparable to those of films formed from conventional polyethylene resins.

The following enumerated embodiments are provided as non-limiting examples.

A first embodiment which is a polymer composition comprising an ethylene alpha-olefin copolymer, wherein the polymer composition is characterized as having (a) a density in the range of from greater than about 0.910 g/cc to about 0.930 g/cc, as determined according to ASTM D1505; (b) a melt index in the range of from greater than about 0.5 g/10 min to about 3 g/10 min, as determined by ASTM D1238, Condition 190° C./2.16 kg; (c) a molecular weight distribution of from about 3.4 to about 12, as determined by gel permeation chromatography; (d) a weight average molecular weight of from greater than about 85 kg/mol to about 160 kg/mol, as determined by gel permeation chromatography; and (e) a z-average molecular weight of from greater than about 210 kg/mol to about 500 kg/mol, as determined by gel permeation chromatography.

A second embodiment which is the polymer composition of the first embodiment having a number average molecular weight of from about 7 kg/mol to about 50 kg/mol.

A third embodiment which is the polymer composition of any of the first through second embodiments having a high load melt index of from about 10 g/10 min. to about 27 g/10 min.

A fourth embodiment which is the polymer composition of any of the first through third embodiments having a ratio of high load melt index to melt index of from about 16 to about 30.

A fifth embodiment which is the polymer composition of any of the first through fourth embodiments having a zero shear viscosity of from about 3000 Pa·s to about 25000 Pa·s.

A sixth embodiment which is the polymer composition of any of the first through fifth embodiments having a CY-a of from about 0.400 to about 0.600.

A seventh embodiment which is a film formed from the polymer compositions of any of the first through sixth embodiments.

An eighth embodiment which is the film of the seventh embodiment having a dart drop strength ranging from about 500 g/mil to about 2000 g/mil.

A ninth embodiment which is the film of any of the seventh through eighth embodiments having a Elmendorf tear strength in the machine direction of from about 70 g/mil to about 300 g/mil.

A tenth embodiment which is the film of any of the seventh though ninth embodiments having an Elmendorf tear strength in the transverse direction of from about 250 g/mil to about 650 g/mil.

An eleventh embodiment which is the film of any of the seventh through tenth embodiments having a seal initiation temperature of from about 85° C. to about 105° C.

A twelfth embodiment which is a fabricated film article comprising a polymer composition which comprises an ethylene alpha-olefin copolymer, wherein the polymer composition is characterized as having (a) a density in the range of from greater than about 0.910 g/cc to about 0.930 g/cc, as determined according to ASTM D1505 (b) a melt index in the range of from greater than about 0.5 g/10 min to about 3 g/10 min, as determined by ASTM D1238, Condition 190° C./2.16 kg; (c) a molecular weight distribution of from about 3.4 to about 12, as determined by gel permeation chromatography; (d) a weight average molecular weight of from greater than about 85 kg/mol to about 160 kg/mol, as determined by gel permeation chromatography; and (e) a z-average molecular weight of from greater than about 210 kg/mol to about 500 kg/mol, as determined by gel permeation chromatography; such that the film article fabricated from the polymer composition is characterized as having a hot tack initiation temperature of less than about 96° C., as determined by ASTM F1921-98, method A.

A thirteenth embodiment which is the fabricated film of the twelfth embodiment wherein the polymer composition has a number average molecular weight of from about 7 kg/mol to about 50 kg/mol.

A fourteenth embodiment which is the fabricated film of any of the twelfth through thirteenth embodiments wherein the polymer composition has a high load melt index of from about 10 g/10 min. to about 27 g/10 min.

A fifteenth embodiment which is the fabricated film of any of the twelfth through fourteenth embodiments wherein the polymer composition has having a ratio of high load melt index to melt index of from about 16 to about 30.

A sixteenth embodiment which is the fabricated film of any of the twelfth through fifteenth embodiments wherein the polymer composition has having a zero shear viscosity of from about 3000 Pa·s to about 25000 Pa·s.

A seventeenth embodiment which is the fabricated film of any of the twelfth through sixteenth embodiments wherein the polymer composition has a CY-a of from about 0.400 to about 0.600.

An eighteenth embodiment which is a fabricated film article comprising a polymer composition which comprises an ethylene alpha-olefin copolymer, wherein the polymer composition is characterized as having (a) a density in the range of from greater than about 0.910 g/cc to about 0.930 g/cc, as determined according to ASTM D1505; (b) a melt index in the range of from greater than about 0.5 g/10 min to about 3 g/10 min, as determined by ASTM D1238, Condition 190° C./2.16 kg; (c) a molecular weight distribution of from about 3.4 to about 12, as determined by gel permeation chromatography; (d) a weight average molecular weight of from greater than about 85 kg/mol to about 160 kg/mol, as determined by gel permeation chromatography; and (e) a z-average molecular weight of from greater than about 210 kg/mol to about 500 kg/mol, as determined by gel permeation chromatography such that the film article fabricated from the polymer composition is characterized as having: (i) a hot tack initiation temperature of less than about 96° C., as determined by ASTM F1921-98, method A; and (ii) a hot tack initiation temperature range of greater than about 20° C., as determined by ASTM F1921-95, method A.

A nineteenth embodiment which is the film of the eighteenth embodiment having a dart drop strength ranging from about 500 g/mil to about 2000 g/mil.

A twentieth embodiment which is a method comprising forming the film of any of the eighteenth through nineteenth embodiments into a package, placing an item into the package, and heat sealing the package to enclose the item placed therein.

While various embodiments have been shown and described, modifications thereof can be made by one skilled in the art without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A film prepared from an ethylene alpha-olefin copolymer having:
    (a) a density in the range of from greater than about 0.910 g/cc to about 0.930 g/cc, as determined according to ASTM D1505;

(b) a melt index in the range of from greater than about 0.5 g/10 min to about 3 g/10 min, as determined according to ASTM D1238, Condition 190° C./2.16 kg;

(c) a molecular weight distribution of from about 3.4 to about 12, as determined by gel permeation chromatography;

(d) a weight average molecular weight of from greater than about 85 kg/mol to about 160 kg/mol, as determined by gel permeation chromatography;

(e) a z-average molecular weight of from greater than about 210 kg/mol to about 500 kg/mol, as determined by gel permeation chromatography;

(f) a ratio of high load melt index to melt index of from about 16 to about 30;

(g) less than 22 branches per 1000 carbon atoms; and (h) a number average molecular weight of from about 7 kg/mol to about 50 kg/mol.

2. The film of claim 1 wherein the copolymer has a high load melt index of from about 10 g/10 min. to about 27 g/10 min.

3. The film of claim 1 wherein the copolymer has a zero shear viscosity of from about 3000 Pa·s to about 25000 Pa·s.

4. The film of claim 1 wherein the copolymer has a CY-a of from about 0.400 to about 0.600.

5. The film of claim 1 having a Elmendorf tear strength in the machine direction of from about 70 g/mil to about 300 g/mil.

6. The film of claim 1 having an Elmendorf tear strength in the transverse direction of from about 250 g/mil to about 650 g/mil.

7. The film of claim 1 having a seal initiation temperature of from about 85° C. to about 105° C.

8. A fabricated film article comprising an ethylene alpha-olefin copolymer having:

(a) a density in the range of from greater than about 0.910 g/cc to about 0.930 g/cc, as determined according to ASTM D1505;

(b) a melt index in the range of from greater than about 0.5 g/10 min to about 3 g/10 min, as determined according to ASTM D1238, Condition 190° C./2.16 kg;

(c) a molecular weight distribution of from about 3.4 to about 12, as determined by gel permeation chromatography;

(d) a weight average molecular weight of from greater than about 85 kg/mol to about 160 kg/mol, as determined by gel permeation chromatography;

(e) a z-average molecular weight of from greater than about 210 kg/mol to about 500 kg/mol, as determined by gel permeation chromatography;

(f) a ratio of high load melt index to melt index of from about 16 to about 30 such that the film article fabricated from the copolymer is characterized as having a hot tack initiation temperature of less than about 96° C., as determined according to ASTM F1921-98, method A; and (g) less than 22 branches per 1000 carbon atoms, wherein the film at 1 mil thickness has a dart drop strength of from 700 g to about 2000 g.

9. The film of claim 8 wherein the copolymer has a number average molecular weight of from about 7 kg/mol to about 50 kg/mol.

10. The film of claim 8 wherein the copolymer has a high load melt index of from about 10 g/10 min. to about 27 g/10 min.

11. The film of claim 8 wherein the copolymer has a zero shear viscosity of from about 3000 Pa·s to about 25000 Pa·s.

12. The film of claim 8 wherein the copolymer has a CY-a of from about 0.400 to about 0.600.

13. A fabricated film article comprising an ethylene alpha-olefin copolymer having:

(a) a density in the range of from greater than about 0.910 g/cc to about 0.930 g/cc, as determined according to ASTM D1505;

(b) a melt index in the range of from greater than about 0.5 g/10 min to about 3 g/10 min, as determined according to ASTM D1238, Condition 190° C./2.16 kg;

(c) a molecular weight distribution of from about 3.4 to about 12, as determined by gel permeation chromatography;

(d) a weight average molecular weight of from greater than about 85 kg/mol to about 160 kg/mol, as determined by gel permeation chromatography;

(e) a z-average molecular weight of from greater than about 210 kg/mol to about 500 kg/mol, as determined by gel permeation chromatography;

(f) a ratio of high load melt index to melt index of from about 16 to about 30 such that the film article fabricated from the copolymer is characterized as having:

(i) a hot tack initiation temperature of less than about 96° C., as determined according to ASTM F1921-98, method A; and (ii) a hot tack initiation temperature range of greater than about 20° C., as determined according to ASTM F1921-95, method A; and (g) less than 22 branches per 1000 carbon atoms, wherein the film at 1 mil thickness has a dart drop strength of from 700 g to about 2000 g.

14. A method comprising forming the film of claim 13 into a package, placing an item into the package, and heat sealing the package to enclose the item placed therein.

15. The film of claim 1 wherein the copolymer melt index value lies within a range that spans less than 2.5 g/10 min, and wherein the copolymer ratio of high load melt index to melt index value lies within a range that spans 14 values.

16. The film of claim 13 wherein the copolymer has a number average molecular weight of from about 7 kg/mol to about 50 kg/mol.

\* \* \* \* \*